(12) United States Patent  (10) Patent No.: US 9,832,421 B2
Liu  (45) Date of Patent: Nov. 28, 2017

(54) APPARATUS AND METHOD FOR CONVERTING A FRAME RATE

(71) Applicant: HISENSE ELECTRIC CO., LTD., Qingdao (CN)

(72) Inventor: Jie Liu, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 49 days.

(21) Appl. No.: 15/151,911

(22) Filed: May 11, 2016

(65) Prior Publication Data

US 2017/0118442 A1 Apr. 27, 2017

(30) Foreign Application Priority Data

Oct. 27, 2015 (CN) .......................... 2015 1 0706466

(51) Int. Cl.
*H04N 7/01* (2006.01)
*H04N 11/20* (2006.01)

(52) U.S. Cl.
CPC ........... *H04N 7/0127* (2013.01); *H04N 7/014* (2013.01); *H04N 7/0125* (2013.01); *H04N 7/0112* (2013.01); *H04N 7/0147* (2013.01)

(58) Field of Classification Search
CPC .. H04N 7/0806; H04N 7/0115; H04N 7/0255; H04N 7/0157; H04N 7/015; H04N 7/014; H04N 7/0125; H04N 7/0127; H04N 9/51; H04N 9/3179; H04N 21/40; H04N 21/218; H04N 2005/91357; H04N 5/4401

USPC ........... 348/452, 456, 449, 474, 490, 430.1, 348/425.1, 412.1, 567, 714, 715, 719, 348/739, 25, 441, 620, 665, 670, 513, 348/523, 522, 317, 231.1, 14.15, 46, 51, 348/43; 375/240.16, 240.27
See application file for complete search history.

(56) References Cited

U.S. PATENT DOCUMENTS

| 5,485,216 | A | * | 1/1996 | Lee | ......................... | H04N 7/012 348/441 |
| 5,754,248 | A | * | 5/1998 | Faroudja | .............. | H04N 7/0112 348/429.1 |
| 5,999,220 | A | * | 12/1999 | Washino | ............... | H04N 7/0125 348/441 |
| 6,151,075 | A | * | 11/2000 | Shin | ........................ | H04N 7/014 348/441 |
| 2005/0078069 | A1 | * | 4/2005 | Aiba | ..................... | G09G 3/3648 345/87 |
| 2006/0159176 | A1 | * | 7/2006 | Park | ........................ | H04N 19/63 375/240.16 |
| 2007/0286282 | A1 | * | 12/2007 | Haskell | ................... | H04N 19/52 375/240.15 |
| 2010/0085295 | A1 | * | 4/2010 | Zhao | .................... | G09G 3/3406 345/102 |

(Continued)

Primary Examiner — Jefferey F Harold
Assistant Examiner — Mustafizur Rahman
(74) Attorney, Agent, or Firm — Harness, Dickey & Pierce, P.L.C.

(57) ABSTRACT

An apparatus and method for converting a frame rate, the method including: receiving a first video signal; extracting target frames corresponding to the first video signal, wherein the target frames include same content as original signal frames corresponding to the first video signal; generating a second video signal from the target frame; and performing a Motion Estimation and Motion Compensation (MEMC) process on the second video signal.

20 Claims, 7 Drawing Sheets

(56) References Cited

U.S. PATENT DOCUMENTS

| | | | |
|---|---|---|---|
| 2010/0232695 A1* | 9/2010 | Higuchi | G06T 5/002 382/167 |
| 2011/0013081 A1* | 1/2011 | Wredenhagen | H04N 7/0112 348/449 |
| 2011/0164115 A1* | 7/2011 | Bennett | G06F 3/14 348/46 |
| 2011/0175979 A1* | 7/2011 | Mizutani | H04N 13/0055 348/43 |
| 2012/0013797 A1* | 1/2012 | Ohta | H04N 7/0112 348/441 |
| 2012/0051442 A1* | 3/2012 | Cristarella | H04N 19/89 375/240.27 |
| 2012/0147261 A1* | 6/2012 | Koizumi | G06T 1/00 348/441 |
| 2012/0212590 A1* | 8/2012 | Kang | H04N 13/0438 348/51 |
| 2012/0288005 A1* | 11/2012 | Shishido | H04N 7/014 375/240.16 |
| 2012/0307142 A1* | 12/2012 | Koizumi | H04N 7/014 348/441 |
| 2013/0057645 A1* | 3/2013 | Chang | H04N 13/0029 348/43 |
| 2013/0254808 A1* | 9/2013 | Fujii | H04N 21/482 725/43 |
| 2014/0063043 A1* | 3/2014 | Mahe | G09G 5/04 345/592 |
| 2014/0185686 A1* | 7/2014 | Wu | H04N 19/00684 375/240.16 |
| 2014/0267467 A1* | 9/2014 | Huang | G09G 3/3611 345/691 |
| 2015/0195562 A1* | 7/2015 | Li | H04N 19/523 375/240.02 |
| 2015/0326923 A1* | 11/2015 | Chung | H04N 21/44021 725/110 |

* cited by examiner

APPARATUS AND METHOD FOR CONVERTING A FRAME RATE

CROSS-REFERENCE TO RELATED APPLICATION

This application claims the benefit and priority of Chinese Patent Application No. 201510706466.8 filed Oct. 27, 2015. The entire disclosure of the above application is incorporated herein by reference.

FIELD

The present disclosure relates to the field of communications and particularly to an apparatus and method for converting a frame rate.

BACKGROUND

This section provides background information related to the present disclosure which is not necessarily prior art.

At present, display devices have been increasingly widely applied along with the development of display technologies, and continuously raising requirement for the higher video resolution, of people. A frame rate in a movie, TV, or computer video display refers to the number of frames or images showed or displayed per second. The frame rate in animation and TV is defined by the Society of Motion Picture and Television Engineers (SMPTE) as a standard. There are universal SMPTE temporal code frame ratios of 24, 25 and 30 frames per second, each of which is applicable to different divisions in the industry. The professional frame rate of movies is 24 frames per second, and the professional frame rate of TV is 30 frames per second.

SUMMARY

This section provides a general summary of the disclosure, and is not a comprehensive disclosure of its full scope or all of its features.

Some embodiments of the disclosure provide a display device including a non-volatile memory and one or more processors, wherein the non-volatile memory stores one or more computer readable program codes, and the one or more processors are configured to execute the one or more computer readable program codes to perform:

receiving a first video signal;

extracting target frames from the first video signal, wherein the target frames include same contents as original signal frames corresponding to the first video signal;

generating a second video signal from the target frames; and performing a Motion Estimation and Motion Compensation (MEMC) process on the second video signal.

Some embodiments of the disclosure provide a method for converting a frame rate, the method including:

receiving a first video signal;

extracting target frames from the first video signal, wherein the target frames include same contents as original signal frames corresponding to the first video signal;

generating a second video signal from the target frames; and performing a Motion Estimation and Motion Compensation (MEMC) process on the second video signal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

In a method and apparatus for converting a frame rate according to the disclosure, target frames corresponding to a received first video signal are extracted to generate a second video signal; and a Motion Estimation and Motion Compensation (MEMC) process is performed on the second video signal, where in some embodiments, the target frames include same contents as original signal frames corresponding to the first video signal, for example, the target frames are the original signal frames corresponding to the first video signal. As compared with the MEMC process being performed directly on the received first video signal, the first video signal is recovered into the second video signal, i.e.

the original signal frame, and then the Motion Estimation and Motion Compensation (MEMC) process is performed on the recovered second video signal, thus avoiding an image from dithering due to a calculation error and a lost frame which would otherwise occur in the MEMC process performed by an FRC.

The method for converting a frame rate according to some embodiments of the disclosure is applicable to a display device, e.g., a TV set, a tablet computer, a handset, and an electronic device including a display screen, or another device capable of displaying an image.

The method for converting a frame rate according to some embodiments of the disclosure is applicable to a TV set, where a frame rate of a video signal received in the TV set is recovered, and the MEMC process is performed on the frame-rate recovered signal.

Figure 1:
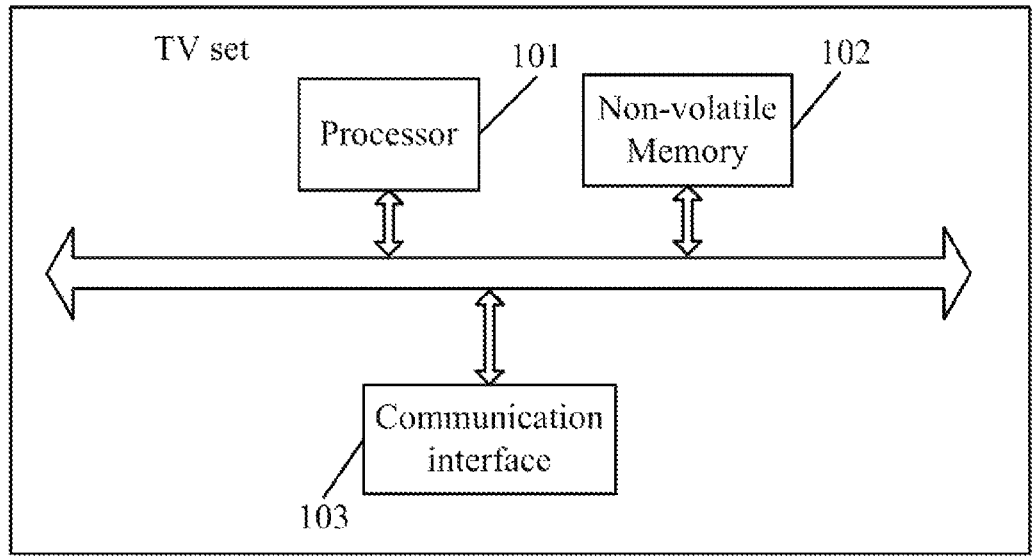
FIG. 1 is a schematic structural diagram of some embodiments of a TV set according to the disclosure.

FIG. 1 is a schematic structural diagram of a TV set according to some embodiments of the disclosure. As illustrated in FIG. 1, the TV set can include a processor 101, a non-volatile memory 102, and a communication interface 103;

Where the non-volatile memory 102 is configured to store a program including program codes including computer operation instructions. The non-volatile memory 102 can be at least one disk memory.

The communication interface 103 is configured to receive a first video signal; and The processor 101 is configured to execute the program stored in the non-volatile memory 102 to perform the method for converting a frame rate according to some embodiments of the disclosure.

In some embodiments of the disclosure, the processor 101 can include a SOC and a FRC.

The components above communicate over one or more buses. Those skilled in the art can appreciate that the disclosure will not be limited to the structure of a built-in device illustrated in FIG. 10, but can be a bus-like structure or a start-like structure, and can include more or less components than those as illustrated, or combination of some components, or different component arrangements.

Figure 11:
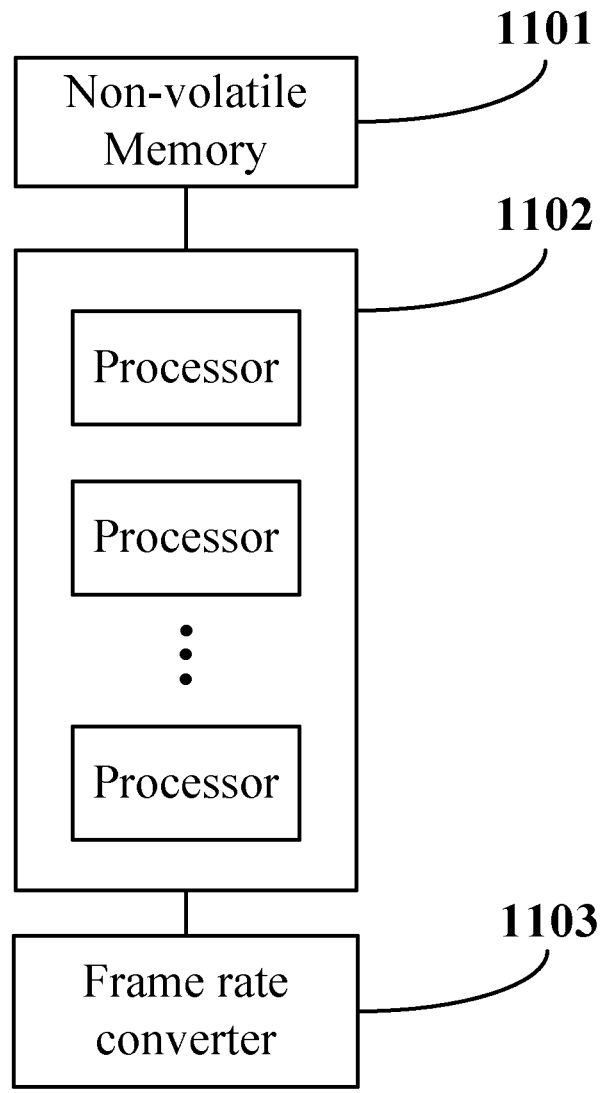
FIG. 11 is a schematic structural diagram of some embodiments of an apparatus for converting a frame rate according to the disclosure.

It shall be noted that the apparatus for converting a frame rate according to an embodiment of the disclosure can be a display device illustrated in FIG. 11 according to the disclosure, or can be built in or attached to the display device illustrated in FIG. 11.

Figure 2:
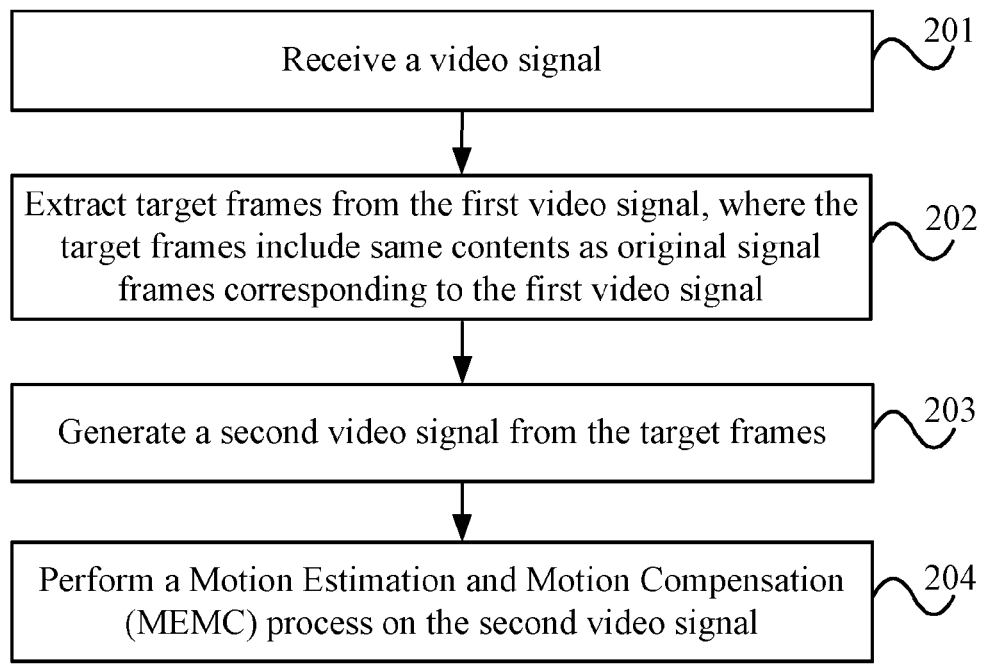
FIG. 2 is a schematic flow chart of some embodiments of a method for converting a frame rate according to the disclosure.
Figure 3:
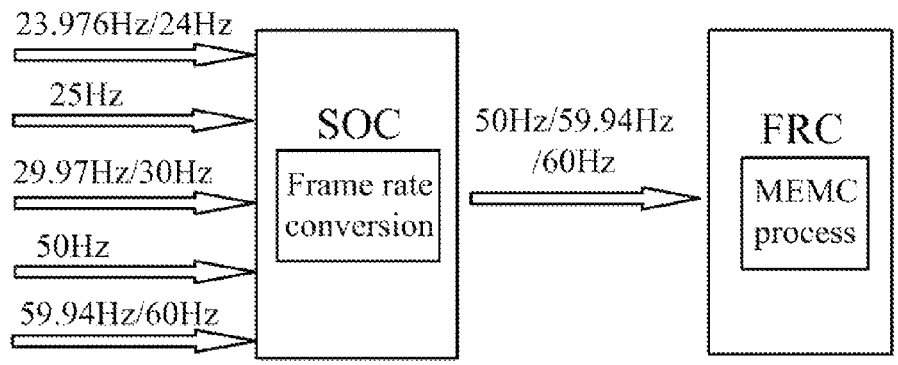
FIG. 3 is a schematic diagram of converting a frame rate in some embodiments of the method for converting a frame rate according to the disclosure.

FIG. 2 is a schematic flow chart of a method for converting a frame rate according to some embodiments of the disclosure. FIG. 3 is a schematic diagram of converting a frame rate in the frame rate according to some embodiments of the disclosure. As illustrated in FIG. 2, the method includes:

The step 201 is to receive a video signal;

The step 202 is to extract target frames corresponding to the first video signal, where the target frames include same contents as original signal frames corresponding to the first video signal;

The step 203 is to generate a second video signal from the target frames; and

The step 204 is to perform a Motion Estimation and Motion Compensation (MEMC) process on the second video signal.

As illustrated in FIG. 3, signals in a number of UHD TV (Ultra High Definition Television) sets are finally output to a TCON (Timer Control Register) or a Frame Rate Converter (FRC) in a signal format with a resolution 4096*2160 and an image refresh frequency of 50 Hz or 60 Hz, and frames of rates of original input signals typically need to be converted by a System on Chip (SOC) end, but the frames of rates of the different input signals may be converted in different algorithms. For example, an original frame of an input signal at 25 Hz is typically converted by the SOC end through 2:2Pulldown into a signal at 50 Hz; an original frame of an input signal at 23.976 Hz or 24 Hz is typically converted by the SOC end through 2:3Pulldown into to generate a signal at 59.94 Hz or 60 Hz; and an original frame of an input signal at 29.97 Hz or 30 Hz is typically converted by the SOC end through 2:2Pulldown into a signal at 59.94 Hz or 60 Hz, so the frame rates of the different input signals will be converted by the SOC end in different frame rate conversion schemes, and after the frame rate-converted signals are transmitted to the Frame Rate Converter (FRC), the FRC performs the MEMC process without knowing that the received signal are generated as a result of conversion by which kind of frame rate conversion schemes, so that an image may dither due to a calculation error and a lost frame. For example, in a case of that the received signal at 60 Hz is generated by the SOC end as a result of conversion through 2:3Pulldown, then if the FRC recovers the original signal frame in a reverse process of 2:2Pulldown, then the recovered signal frame may include a duplicated signal frame.

In some embodiments of the disclosure, for the received first video signal, the target frames in the first video signal are extracted to generate the second video signal, and if each of the target frames is an original signal frame corresponding to the first video signal, then the second video signal is the original signal frame corresponding to the first video signal, that is, the original signal frame is recovered from the received first video signal, so the frame rate of the second video signal is equal to the frame rate of the original signal frame corresponding to the first video signal. If the frame rate of the first video signal is 59.94 Hz, then the first video signal is recovered to the second video signal, and at this time, the frame rate of the second video signal is 23.976 Hz or 29.97 Hz; if the frame rate of the first video signal is 60 Hz, then the first video signal is recovered to the second video signal, and at this time, the frame rate of the second video signal is 24 Hz or 30 Hz; and if the frame rate of the first video signal is 50 Hz, then the first video signal is recovered to the second video signal, and at this time, the frame rate of the second video signal is 25 Hz; or if the received first video signal is the original signal frame without being subjected to any frame rate conversion, then the second video signal is the same as the first video signal, and the frame rate of the second video signal is equal to the frame rate of the first video signal.

The first video signal is converted into the second video signal, that is, after the original signal frame is recovered from the first video signal, the Motion Estimation and Motion Compensation (MEMC) process is performed on the second video signal, and at this time, since the Motion Estimation and Motion Compensation (MEMC) process is performed on the original signal frame, the aforementioned problem will not occur.

In the method for converting a frame rate according to some embodiments of the disclosure, the target frames corresponding to the received first video signal are extracted to generate the second video signal, where each of the target frames is an original signal frame corresponding to the first video signal, and the Motion Estimation and Motion Compensation (MEMC) process is performed on the second video signal. As compared with the MEMC process being performed directly on the received first video signal, an image can be avoided from dithering due to a calculation error and a lost frame which would otherwise occur in the MEMC process performed by the FRC.

In some embodiments of the disclosure, the target frames in the first video signal can be extracted to generate the second video signal particularly in a number of ways, for example:

A signal frame in the first video signal, which is different from an adjacent succeeding frame of signal (i.e. an adjacent frame of signal succeeding the signal frame) is determined as a target frame to generate the second video signal; or A signal frame in the first video signal, which is different from an adjacent preceding frame of signal (i.e. an adjacent frame of signal preceding the signal frame) is determined as a target frame to generate the second video signal.

Figure 4:
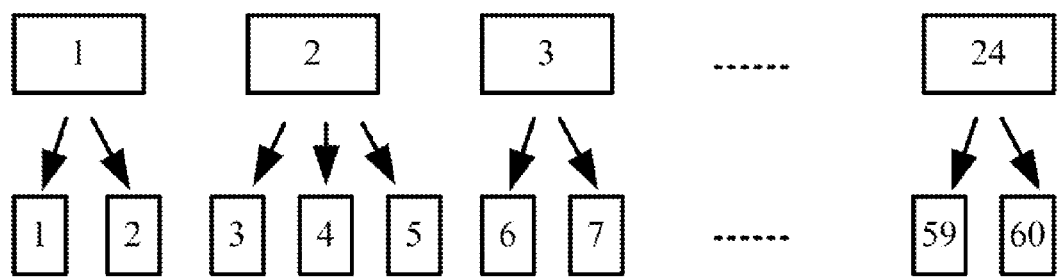
FIG. 4 is a schematic diagram of converting a frame rate in some embodiments of the method according to the disclosure.

As illustrated in FIG. 4, if the frame rate of the original signal frame is 24 Hz, and the original signal frame is converted into the first video signal through 2:3Pulldown, where the frame rate is 60 Hz, then the original signal frame will be recovered from the first video signal in a reverse process of 2:3Pulldown, where adjacent signal frames can be caught, and it can be determined whether the adjacent signal frames are the same, thus extracting a target frame, i.e., the original signal frame. It is determined whether some signal frame is the same as an adjacent succeeding frame of signal, and if not, then the signal frame is determined as a target frame, and the extracted target frames are arranged sequentially into the second video signal according to the first video signal, resulting in the second video signal; or it is determined whether some signal frame is the same as an adjacent preceding frame of signal, and if not, then the signal frame is determined as a target frame, and the extracted target frames are arranged in a selection order of target frame into the second video signal according to the first video signal, resulting in the second video signal.

Here the target frames can be arranged per clock sequentially into the second video signal under the control of a clock signal.

Figure 5:
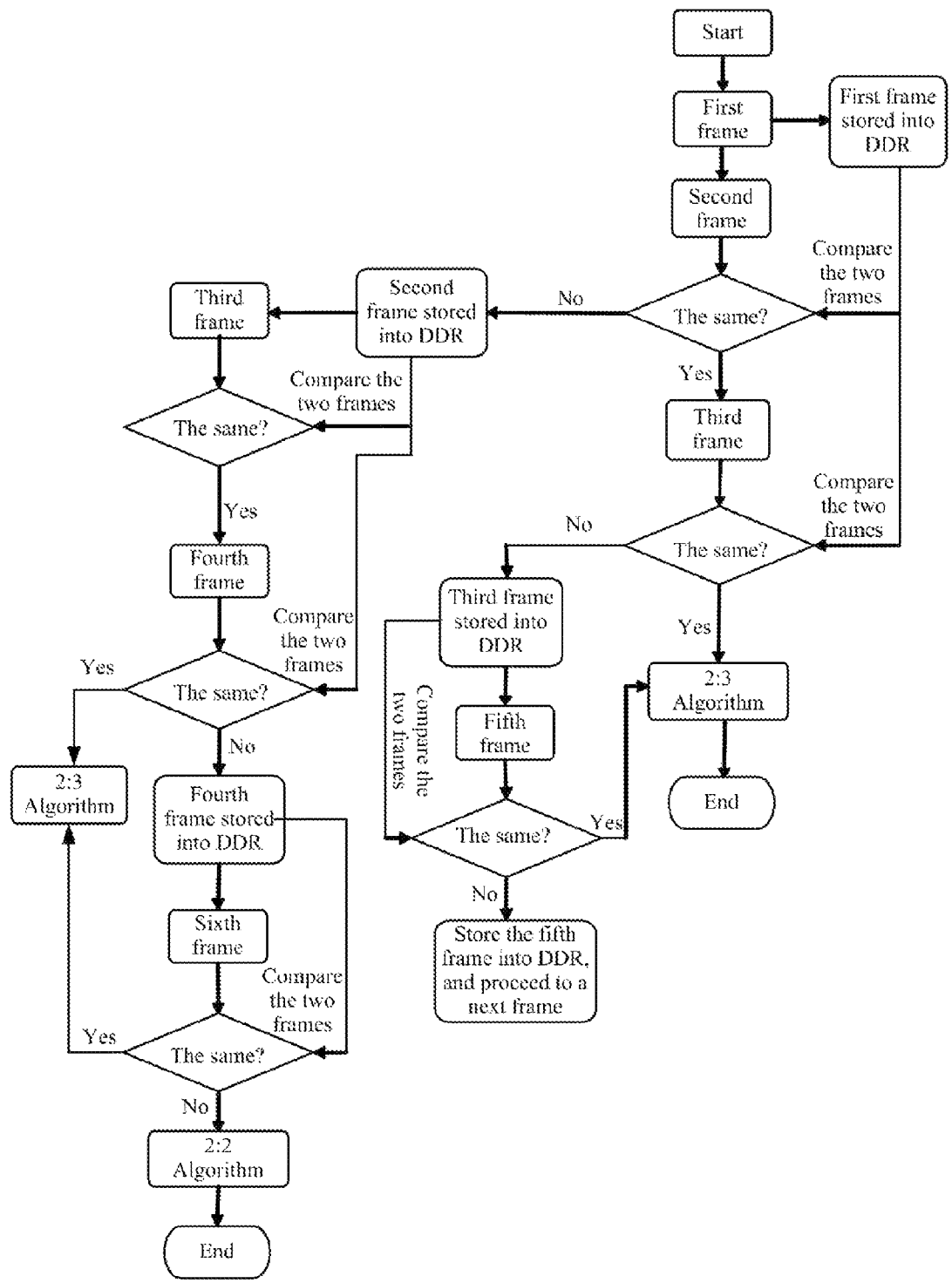
FIG. 5 is a schematic diagram of recovering a frame rate some embodiments of the method according to the disclosure.

In some embodiments of the disclosure, the frame rate can be recovered as follows:

As illustrated in FIG. 5, firstly a random first frame of the received first video signal is stored as a reference into a fixed address space of a Synchronous Dynamic Random Access Memory Double Data Rate (SDRAM DDR), and then a succeeding second frame of signal is compared with the first frame of signal, and if the second frame of signal is the same as the first frame of signal, then the first frame of signal in the DDR space is maintained, and a succeeding frame of signal is further compared therewith, and if the third frame of signal is the same as the second frame of signal, then it can be determined that the first video signal is generated as a result of conversion through 2:3Pulldown, so the second video signal is recovered in a reverse process of 2:3Pulldown; and if the third frame of signal is different from the second frame of signal, then the third frame of signal can be stored into the DDR space, and next the fifth frame of signal can be compared directly with the third frame of signal, and if the fifth frame of signal is the same as the third frame of signal, then since the first frame of signal is the same as the second frame of signal, and the third frame of signal is the same as the fifth frame of signal, which indicates that the first video signal is generated as a result of conversion through 2:3Pulldown, the second video signal can be recovered in a reverse process of 2:3Pulldown; and if the fifth frame of signal is different from the third frame of signal, then the fifth frame of signal can be stored into the DDR space, and succeeding frames of signal can be compared sequentially therewith until the flow ends; and If the second frame of signal is different from the first frame of signal, then the first frame of signal is replaced with the second frame of signal and the second frame of signal is stored into the DDR space, and a succeeding frame of signal is further compared, and if the third frame of signal is the same as the second frame of signal, then the fourth frame of signal is further compared therewith, and if the fourth frame of signal is the same as the second frame of signal, which indicates that the first video signal is generated as a result of conversion through 2:3Pulldown, then the second video signal is recovered in a reverse process of 2:3Pulldown; and if the fourth frame of signal is different from the second frame of signal, then the fourth frame of signal is stored into the DDR space, and next it is determined whether the sixth frame of signal is the same as the fourth frame of signal, and if so, which indicates that the first video signal is generated as a result of conversion through 2:3Pulldown, then the second video signal is recovered in a reverse process of 2:3Pulldown; otherwise, which indicates that the first video signal is generated as a result of conversion through 2:2Pulldown, then the second video signal is recovered in a reverse process of 2:2Pulldown.

In the embodiment above, a signal frame in the first video signal, which is different from an adjacent succeeding frame of signal is determined as a target frame to generate the second video signal; or a signal frame in the first video signal, which is different from an adjacent preceding frame of signal is determined as a target frame to generate the second video signal.

Figure 6:
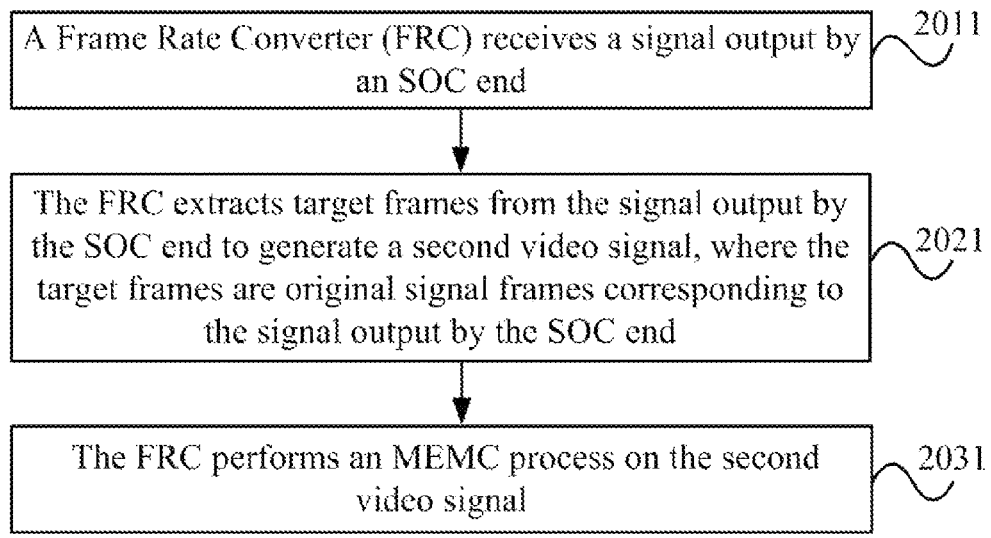
FIG. 6 is a schematic flow chart of some embodiments of the method for converting a frame rate according to the disclosure.

In some embodiments of the disclosure, a first video signal is a signal output by a System on Chip (SOC) end, and as illustrated in FIG. 6, a method for converting a frame rate includes:

In the step 2011, a Frame Rate Converter (FRC) receives a signal output by an SOC end;

In the step 2021, the FRC extracts target frames in the signal output by the SOC end to generate a second video signal, where each of the target frames is an original signal frame corresponding to the signal output by the SOC end; and In the step 2031, the FRC performs an MEMC process on the second video signal.

Figure 7:
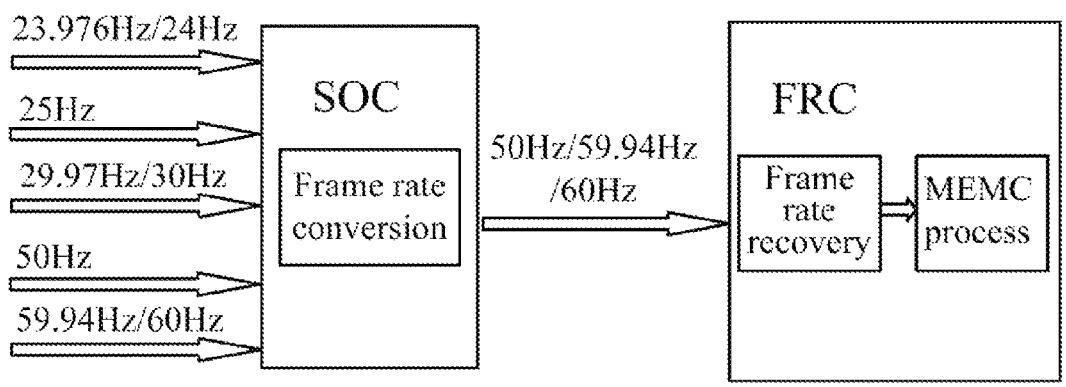
FIG. 7 is a schematic diagram of converting a frame rate in some embodiments of the method for converting a frame rate according to the disclosure.

As illustrated in FIG. 7, the SOC end converts frame rate of the received input signal, if the frame rate of the received signal is 23.976 Hz, 24 Hz, 25 Hz, 29.97 Hz or 30 Hz, then the SOC converts the signal into a signal at 50 Hz or 59.94 Hz or 60 Hz respectively, if the frame rate of the received signal is 50 Hz or 59.94 Hz or 60 Hz, then the SOC may not perform any process on the signal, but can transmit the signal directly to the backend FRC or TCON for processing. At this time, the first video signal is a signal output by the SOC end, the FRC receives the first video signal, and extracts target frames in the signal output by the SOC end to generate the second video signal, that is, the FRC recovers the first video signal to original signal frames, and performs the MEMC process on the second video signal.

If the FRC receives a signal output by the SOC at the frame rate of 23.976 Hz, 24 Hz, 25 Hz, 29.97 Hz or 30 Hz, then the signal is the original signal frame, so the FRC may not perform any process on the signal, but can perform the MEMC process directly thereon; and if the FRC receives a signal output by the SOC at the frame rate of 50 Hz, then the signal is typically generated as a result of 2:2Pulldown on the original signal frame, so several adjacent frames of the signal can be caught and compared with each other to determine the original signal frame of the video signal so as to obtain the original signal frame at 25 Hz.

If the FRC receives a signal output by the SOC at the frame rate of 59.94 Hz or 60 Hz, then the signal may be generated as a result of 2:3Pulldown on a signal at 23.976 Hz or 24 Hz, or may be generated as a result of 2:2Pulldown on a signal at 29.97 Hz or 30 Hz, so several adjacent frames of signal can also be caught to determine the original signal frame of the video signal so as to obtain the corresponding original signal frame at 23.976 Hz, 24 Hz, 29.97 Hz or 30 Hz.

In some embodiments of the disclosure, the Frame Rate Converter (FRC) receives a signal output by the SOC end, and the FRC extracts target frames in the signal output by the SOC end to generate the second video signal, where each of the target frames is an original signal frame corresponding to the signal output by the SOC end; the FRC performs the MEMC process on the second video signal, and as compared with the MEMC process being performed by the FRC directly on the received first video signal, the FRC recovers the second video signal, i.e., the original signal frame, from the first video signal, and further performs the Motion Estimation and Motion Compensation (MEMC) process on the second video signal generated as a result of the recovery, thus avoiding an image from dithering due to a calculation error and a lost frame which would otherwise occur in the MEMC process performed by the FRC.

Figure 8:
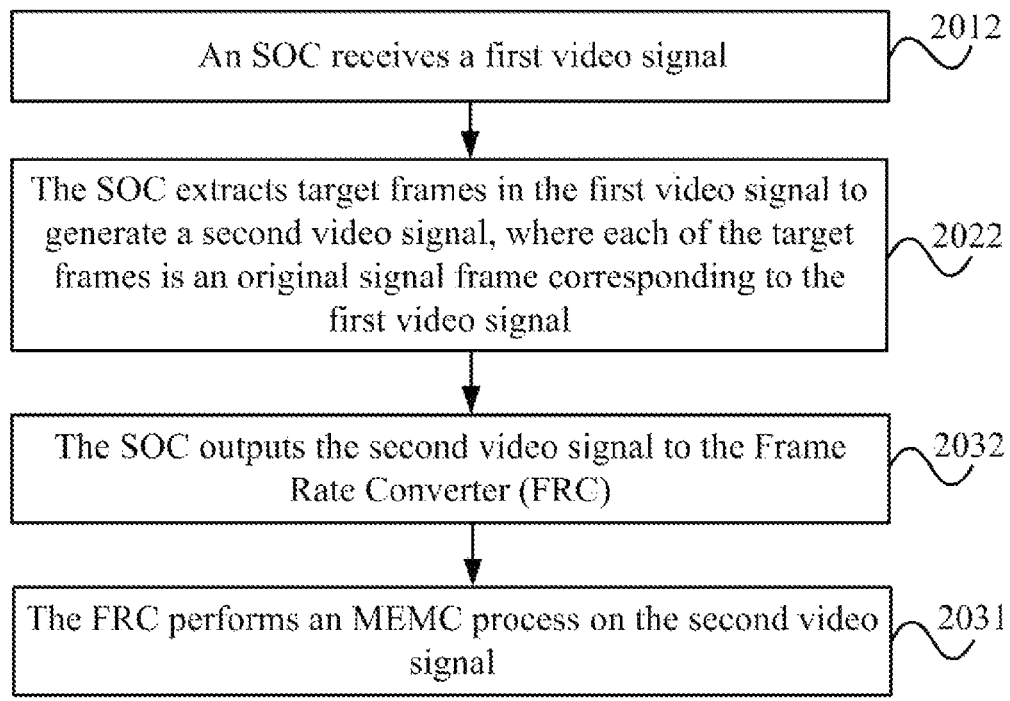
FIG. 8 is a schematic flow chart of some embodiments of the method for converting a frame rate according to the disclosure.

In some embodiments of the disclosure, the first video signal is an input signal of a System on Chip (SOC) end, and as illustrated in FIG. 8, a method for converting a frame rate includes:

In the step 2012, an SOC receives a first video signal

In the step 2022, the SOC extracts target frames in the first video signal to generate a second video signal, where each of the target frames is an original signal frame corresponding to the first video signal;

In the step 2032, the SOC outputs the second video signal to the Frame Rate Converter (FRC); and In the step 2031, the FRC performs an MEMC process on the second video signal.

Figure 9:
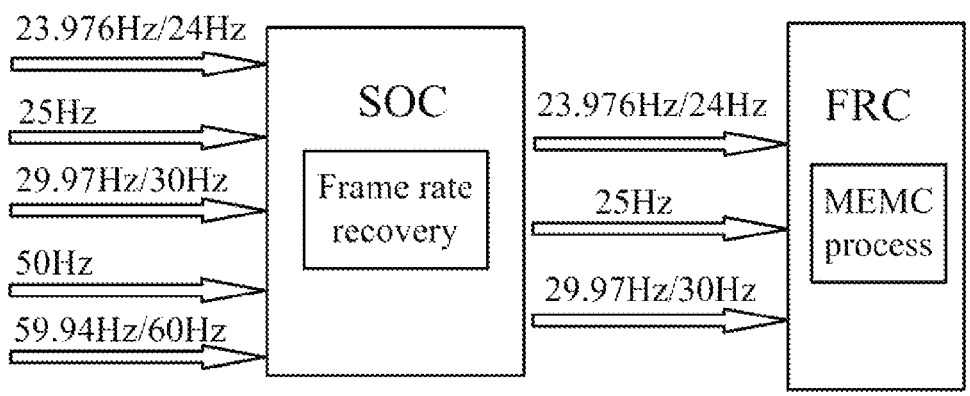
FIG. 9 is a schematic diagram of converting a frame rate in some embodiments of the method for converting a frame rate according to the disclosure.

The first video signal is an input signal of the SOC end, and the SOC receives the first video signal, and extracts the target frames in the first video signal to generate the second video signal, that is, the FRC recovers the original signal frame from the first video signal, and outputs the second video signal to a Frame Rate Converter (FRC), and the FRC performs the MEMC process on the second video signal; and as illustrated in FIG. 9, if frame rate of the signal received by the SOC is 23.976 Hz, 24 Hz, 25 Hz, 29.97 Hz or 30 Hz, then the SOC will not perform any process on the signal, but can transmit the signal directly to the backend FRC or TCON for processing; and if the frame rate of the signal received by the SOC is 50 Hz, then the signal is typically generated as a result of 2:2Pulldown on the original signal frame, so several adjacent frames of the signal can be caught to determine the original signal frame of the video signal so as to obtain an original signal frame at 25 Hz.

If the SOC receives a signal at the frame rate of 59.94 Hz or 60 Hz, then the signal may be generated as a result of 2:3Pulldown on the signal at 23.976 Hz or 24 Hz, or may be generated as a result of 2:2Pulldown on the signal at 29.97 Hz or 30 Hz, so several adjacent frames of the signal can also be caught and compared with each other to determine the original signal frame of the video signal so as to obtain the corresponding original signal frame at 23.976 Hz, 24 Hz, 29.97 Hz or 30 Hz.

In the aforementioned embodiments of the disclosure, the SOC receives the first video signal, and the SOC extracts the target frames from the first video signal to generate the second video signal, where each of the target frames is the original signal frame corresponding to the first video signal; and the SOC outputs the second video signal to the Frame Rate Converter (FRC), and performs the MEMC process on the second video signal, and as compared with the MEMC process being performed by the FRC directly on the received first video signal, the FRC recovers the second video signal, i.e., the original signal frame, from the first video signal, and further performs the Motion Estimation and Motion Compensation (MEMC) process on the second video signal generated as a result of the recovery, thus avoiding an image from dithering due to a calculation error and a lost frame which would otherwise occur in the MEMC process performed by the FRC.

Figure 10A:
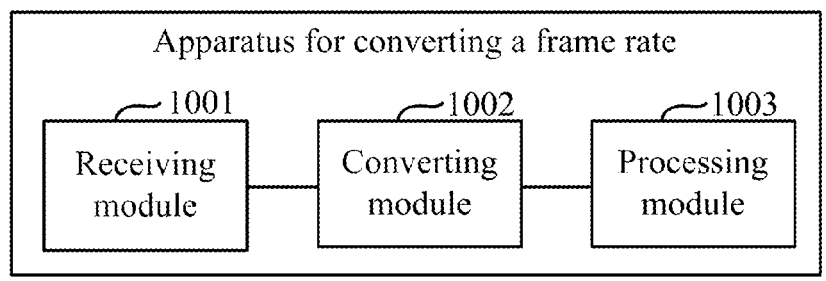
FIG. 10A is a schematic structural diagram of some embodiments of an apparatus for converting a frame rate according to the disclosure.

Some embodiments of the disclosure further provide an apparatus for converting a frame rate, and as illustrated in FIG. 10A, the apparatus for converting a frame rate can include a receiving module 1001, a converting module 1002, and a processing module 1003, where:

The receiving module 1001 is configured to receive a first video signal;

The converting module 1002 is configured to extract target frames from the first video signal to generate a second video signal, where:

The target frames include same content as original signal frames corresponding to the first video signal; and The processing module 1003 is configured to perform a Motion Estimation and Motion Compensation (MEMC) process on the second video signal.

As illustrated in FIG. 3, signals in a number of UHD TV sets are finally output to a TCON or a Frame Rate Converter (FRC) in a signal format with a resolution 4096*2160 and an image refresh frequency of 50 Hz or 60 Hz, and frames of rates of original input signals typically need to be converted by a System on Chip (SOC) end, but the frames of rates of the different input signals may be converted in different algorithms. For example, an original frame of an input signal at 25 Hz is typically converted by the SOC end through 2:2Pulldown into a signal at 50 Hz; an original frame of an input signal at 23.976 Hz or 24 Hz is typically converted by the SOC end through 2:3Pulldown into to generate a signal at 59.94 Hz or 60 Hz; and an original frame of an input signal at 29.97 Hz or 30 Hz is typically converted by the SOC end through 2:2Pulldown into a signal at 59.94 Hz or 60 Hz, so the frame rates of the different input signals will be converted by the SOC end in different fame rate conversion schemes, and after the frame rate-converted signals are transmitted to the Frame Rate Converter (FRC), the FRC performs the MEMC process without knowing that the received signal are generated as a result of conversion by which kind of frame rate conversion schemes, so that an image may dither due to a calculation error and a lost frame. For example, in a case of that the received signal at 60 Hz is generated by the SOC end as a result of conversion through 2:3Pulldown, then if the FRC recovers the original signal frame in a reverse process of 2:2Pulldown, then the recovered signal frame may include a duplicated signal frame.

In some embodiments of the disclosure, for the first video signal received by the receiving module 1001, the converting module 1002 extracts the target frames in the first video signal to generate the second video signal, and particularly the second video signal can be the original signal frame corresponding to the first video signal, that is, the original signal frame is recovered from the received first video signal, so the frame rate of the second video signal is equal to the frame rate of the original signal frame corresponding to the first video signal. If the frame rate of the first video signal is 59.94 Hz, then the second video signal is recovered from the first video signal, and at this time, the frame rate of the second video signal is 23.976 Hz or 29.97 Hz; if the frame rate of the first video signal is 60 Hz, then the second video signal is recovered from the first video signal, and at this time, the frame rate of the second video signal is 24 Hz or 30 Hz; and if the frame rate of the first video signal is 50 Hz, then the second video signal is recovered from the first video signal, and at this time, the frame rate of the second video signal is 25 Hz; or if the received first video signal is the original signal frame without being subjected to any frame rate conversion, then the second video signal is the same as the first video signal, and the frame rate of the second video signal is equal to the frame rate of the first video signal.

The first video signal is converted into the second video signal, that is, after the original signal frame is recovered from the first video signal, the processing module 1003 performs the Motion Estimation and Motion Compensation (MEMC) process on the second video signal, and at this time, since the MEMC process is performed on the original signal frame, the problem above will not occur.

In the apparatus for converting a frame rate according to some embodiments of the disclosure, the converting module extracts the target frames from the first video signal received by the receiving module to generate the second video signal, where the target frame is the original signal frame corresponding to the first video signal, and the processing module performs the Motion Estimation and Motion Compensation (MEMC) process on the second video signal. As compared with the MEMC process being performed directly on the received first video signal, the second video signal, i.e., the original signal frame, is recovered from the first video signal, and then the Motion Estimation and Motion Compensation (MEMC) process is performed on the recovered second video signal, so that an image can be avoided from dithering due to a calculation error and a lost frame which would otherwise occur in the MEMC process performed by the FRC.

In some embodiments of the disclosure, the first video signal is a signal output by a System on Chip (SOC) end; and Accordingly the receiving module 1001, the converting module 1002, and the processing module 1003 are arranged on a Frame Rate Converter (FRC).

In some embodiments of the disclosure, the first video signal is an input signal to a System on Chip (SOC) end; and The receiving module 1001 and the converting module 1002 are arranged on the SOC.

Figure 10B:
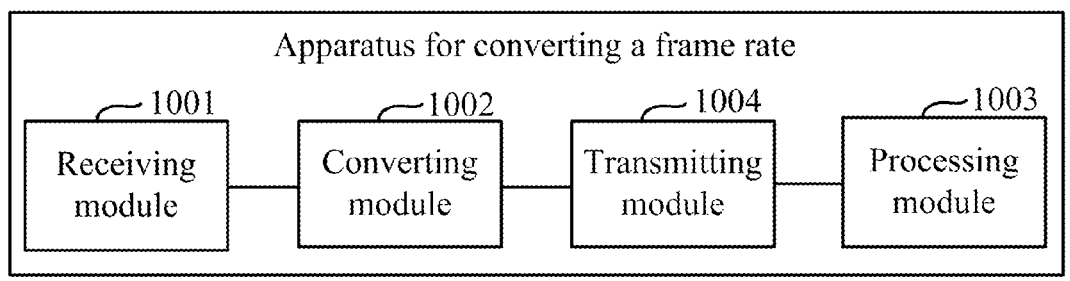
FIG. 10B is a schematic structural diagram of some embodiments of an apparatus for converting a frame rate according to the disclosure.

In some embodiments of the disclosure, as illustrated in FIG. 10B:

The apparatus for converting a frame rate can further include a transmitting module 1004 configured to transmit the second video signal to the processing module 1003; and The transmitting module 1004 is arranged on a System on Chip (SOC), and Accordingly the processing module 1003 is arranged on a Frame Rate Converter (FRC).

In some embodiments of the disclosure, the converting module 1002 is configured:

To determine a signal frame in the first video signal, which is different from an adjacent succeeding frame of signal, as a target frame to generate the second video signal; or To determine a signal frame in the first video signal, which is different from an adjacent preceding frame of signal, as a target frame to generate the second video signal.

The apparatus for converting a frame rate according to some embodiments of the disclosure can perform the method for converting a frame rate according to the embodiments above.

FIG. 11 is a schematic structural diagram of a display device according to an embodiment of the disclosure, which includes a non-volatile memory 1101 and one or more processors 1102, where the non-volatile memory stores one or more computer readable program codes, and the one or more processors 1102 are configured to execute the one or more computer readable program codes to perform:

Receiving a first video signal;

Extracting target frames from the first video signal, where the target frames include same contents as original signal frames corresponding to the first video signal;

Generating a second video signal from the target frames; and

Performing a Motion Estimation and Motion Compensation (MEMC) process on the second video signal.

Optionally, the display device further includes a frame rate converter 1103, and the first video signal is a signal output by a System on Chip (SOC) end;

Receiving the first video signal includes:

A Frame Rate Converter (FRC) receiving the signal output by the SOC end;

The extracting the target frames from the first video signal includes:

The FRC extracting the target frames from the signal output by the SOC end; and

The performing the Motion Estimation and Motion Compensation (MEMC) process on the second video signal includes:

The FRC performs the MEMC process on the second video signal.

Optionally, the first video signal is an input signal of a System on Chip (SOC) end;

The receiving the first video signal includes:

The SOC end receives the first video signal; and

The extracting the target frames from the first video signal includes:

The SOC end extracts the target frames from the first video signal.

Optionally, the display device further includes a frame rate converter 1103, and the one or more processors 1102 are further configured to execute the one or more computer readable program codes to perform:

The SOC end outputs the second video signal to a Frame Rate Converter (FRC); and Performing the Motion Estimation and Motion Compensation (MEMC) process on the second video signal includes:

The FRC performs the MEMC process on the second video signal.

Optionally each of the target frames is the original signal frame corresponding to the first video signal.

Optionally, each of the target frames is a signal frame in the first video signal, which is different from an adjacent succeeding frame of signal.

Optionally, each of the target frames is a signal frame in the first video signal, which is different from an adjacent preceding frame of signal.

Optionally the generating the second video signal from the target frames includes:

Arranging the target frames per clock sequentially into the second video signal according to a clock signal.

Optionally the generating the second video signal from the target frames includes:

Arranging the target frames in extraction order of the target frames sequentially into the second video signal according to the first video signal.

An embodiment of the disclosure provides a computer readable storage medium on which instruction codes are stored, where the instruction codes are executed to perform at least the operations of:

Receiving a first video signal;

Extracting target frames from the first video signal, where the target frames include same contents as original signal frames corresponding to the first video signal;

Generating a second video signal from the target frames; and

Performing a Motion Estimation and Motion Compensation (MEMC) process on the second video signal.

Optionally, each of the target frames is the original signal frame corresponding to the first video signal, or each of the target frames is a signal frame in the first video signal, which is different from an adjacent succeeding frame of signal, or each of the target frames is a signal frame in the first video signal, which is different from an adjacent preceding frame of signal.

In the several embodiments of the disclosure, it shall be appreciated that the disclosed apparatuses and the methods can be embodied otherwise. For example the embodiments of the apparatuses described above are merely illustrative, for example, the apparatuses have been just divided into the modules or the units in terms of their logical functions but can be divided otherwise in a real implementation, for example, more than one of the units or the components can be combined or can be integrated into another system, or some of the features can be ignored or may not be implemented. Furthermore the illustrated or described coupling or direct coupling or communication connection between the units or the components can be established via some interfaces, and indirect coupling or communication connection between the devices or units, and can be electrical, mechanical or in another form.

The modules described as separate components may or may not be physically separate, and components illustrated as modules may or may not be physical modules, that is, they can be co-located or can be distributed onto a number of network elements. A part or all of the modules can be selected for the purpose of the solutions according to the embodiments as needed in reality.

Those ordinarily skilled in the art can appreciate that all or a part of the steps in the methods according to the embodiments described above can be performed by program instructing relevant hardware, where the programs can be stored in a computer readable storage medium, and the programs can perform one or a combination of the steps in the method embodiments upon being executed; and the storage medium includes an ROM, an RAM, a magnetic disc, an optical disk, or any other medium which can store program codes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device comprising a non-volatile memory and one or more processors, the non-volatile memory storing one or more computer readable program codes, the one or more processors configured to execute the one or more computer readable program codes to:
   receive a first video signal;
   extract target frames from the first video signal, the target frames comprising a same content as original signal frames corresponding to the first video signal;
   generate a second video signal from the target frames; and
   perform a Motion Estimation and Motion Compensation (MEMC) process on the second video signal.

2. The display device according to claim 1, further comprising a Frame Rate Converter (FRC), wherein:
   the first video signal is a signal output by a System on Chip (SOC) end;
   receiving the first video signal comprises receiving, by the FRC, the signal output by the SOC end;
   extracting the target frames from the first video signal comprises extracting, by the FRC, the target frames from the signal output by the SOC end; and
   performing the MEMC process on the second video signal comprises performing, by the FRC, the MEMC process on the second video signal.

3. The display device according to claim 1, wherein:
   the first video signal is an input signal of a System on Chip (SOC) end;
   receiving the first video signal comprises receiving, by the SOC end, the first video signal; and
   extracting the target frames from the first video signal comprises extracting, by the SOC end, the target frames from the first video signal.

4. The display device according to claim 3, further comprising a Frame Rate Converter (FRC), wherein:
   the one or more processors are further configured to execute the one or more computer readable program codes to output, by the SOC end, the second video signal to the FRC; and
   performing the MEMC process on the second video signal comprises performing, by the FRC, the MEMC process on the second video signal.

5. The display device according to claim 1, wherein the target frames are the original signal frames corresponding to the first video signal.

6. The display device according to claim 1, wherein each of the target frames is a signal frame in the first video signal, and said signal frame is different from an adjacent succeeding signal frame.

7. The display device according to claim 1, wherein each of the target frames is a signal frame in the first video signal, and said signal frame is different from an adjacent preceding signal frame.

8. The display device according to claim 1, wherein generating the second video signal from the target frames comprises:
   arranging the target frames sequentially into the second video signal according to a clock signal.

9. The display device according to claim 1, wherein generating the second video signal from the target frames comprises:
   arranging the target frames into the second video signal according to an extraction order of the target frames from the first video signal.

10. A method for converting a frame rate, the method comprising:
  receiving a first video signal;
  extracting target frames from the first video signal, the target frames comprising a same content as original signal frames corresponding to the first video signal;
  generating a second video signal from the target frames; and
  performing a Motion Estimation and Motion Compensation (MEMC) process on the second video signal.

11. The method according to claim 10, wherein:
  the first video signal is a signal output by a System on Chip (SOC) end;
  receiving the first video signal comprises receiving, by a Frame Rate Converter (FRC), the signal output by the SOC end;
  extracting the target frames from the first video signal comprises extracting, by the FRC, the target frames from the signal output by the SOC end; and
  performing the MEMC process on the second video signal comprises performing, by the FRC, the MEMC process on the second video signal.

12. The method according to claim 10, wherein:
  the first video signal is an input signal of a System on Chip (SOC) end;
  receiving the first video signal comprises receiving, by the SOC end, the first video signal; and
  extracting the target frames from the first video signal comprises extracting, by the SOC end, the target frames from the first video signal.

13. The method according to claim 12, further comprising:
  outputting, by the SOC end, the second video signal to a Frame Rate Converter (FRC);
  wherein performing the MEMC process on the second video signal comprises performing, by the FRC, the MEMC process on the second video signal.

14. The method according to claim 10, wherein the target frames are the original signal frames corresponding to the first video signal.

15. The method according to claim 10, wherein each of the target frames is a signal frame in the first video signal, and said signal frame is different from an adjacent succeeding signal frame.

16. The method according to claim 10, wherein each of the target frames is a signal frame in the first video signal, and said signal frame is different from an adjacent preceding signal frame.

17. The method according to claim 10, wherein generating the second video signal from the target frames comprises:
  arranging the target frames sequentially into the second video signal according to a clock signal.

18. The method according to claim 10, wherein generating the second video signal from the target frames comprises:
  arranging the target frames into the second video signal according to an extraction order of the target frames from the first video signal.

19. A non-transitory computer readable storage medium on which instruction codes are stored, the instruction codes executable to perform at least the operations of:
  receiving a first video signal;
  extracting a target frame corresponding to the first video signal, the target frame comprising a same content as an original signal frame corresponding to the first video signal;
  generating a second video signal from the target frame; and
  performing a Motion Estimation and Motion Compensation (MEMC) process on the second video signal.

20. The storage medium according to claim 19, wherein:
  the target frame is the original signal frame corresponding to the first video signal; or
  the target frame is a signal frame in the first video signal, and said signal frame is different from an adjacent succeeding signal frame or is different from an adjacent preceding signal frame.

* * * * *